US012552639B2

(12) United States Patent
Leppakoski et al.

(10) Patent No.: US 12,552,639 B2
(45) Date of Patent: Feb. 17, 2026

(54) MOVEMENT EVALUATION METHOD FOR AN ELEVATOR CAR

(71) Applicant: Kone Corporation, Helsinki (FI)

(72) Inventors: Arttu Leppakoski, Helsinki (FI); Atso Koskinen, Helsinki (FI)

(73) Assignee: Kone Corporation, Helsinki (FI)

( * ) Notice: Subject to any disclaimer, the term of this patent is extended or adjusted under 35 U.S.C. 154(b) by 1271 days.

(21) Appl. No.: 17/242,720

(22) Filed: Apr. 28, 2021

(65) Prior Publication Data

US 2021/0371243 A1 Dec. 2, 2021

(30) Foreign Application Priority Data

May 27, 2020 (EP) .................................... 20176736

(51) Int. Cl.
*B66B 5/06* (2006.01)
*B66B 1/34* (2006.01)

(52) U.S. Cl.
CPC .............. *B66B 5/06* (2013.01); *B66B 1/3407* (2013.01); *B66B 1/3492* (2013.01)

(58) Field of Classification Search
CPC ........ B66B 5/06; B66B 1/3407; B66B 1/3492
See application file for complete search history.

(56) References Cited

U.S. PATENT DOCUMENTS 4,362,224 A * 12/1982 Fairbrother ............... B66B 1/50 187/291
4,658,935 A * 4/1987 Holland .................... B66B 1/50 187/293
5,747,755 A 5/1998 Coste et al.
5,886,308 A * 3/1999 Ericson ..................... B66B 7/10 187/391
6,526,368 B1 * 2/2003 Coste ........................ B66B 1/40 702/150
7,597,176 B2 * 10/2009 Zaharia ................. B66B 1/3492 73/1.79

(Continued)

FOREIGN PATENT DOCUMENTS

CN 109789988 A 5/2019
EP 2189410 A1 5/2010

(Continued)

OTHER PUBLICATIONS

Chinese Office Action dated May 1, 2025 issued in corresponding Chinese Patent Appln. No. 202110550128.5.

(Continued)

*Primary Examiner* — Rina I Duda
(74) *Attorney, Agent, or Firm* — Harness, Dickey & Pierce, P.L.C.

(57) ABSTRACT

The present invention is about a system and method for evaluating the movement of an elevator car within a hoistway. The same is based on gathering movement data of the car by means of a rotation encoder or acceleration sensor. Since these data are counted pulses there is a need to convert them into real movement data. This conversion is calibrated automatically by comparing the movement data with a length distance being passed by the car, wherein said length distance is configured to be unchangeable over the time. Base on the exact movement results gained therewith by means of said calibration one also gets better position results of the car in the hoistway.

20 Claims, 3 Drawing Sheets

(56) References Cited

U.S. PATENT DOCUMENTS

Figure 1:
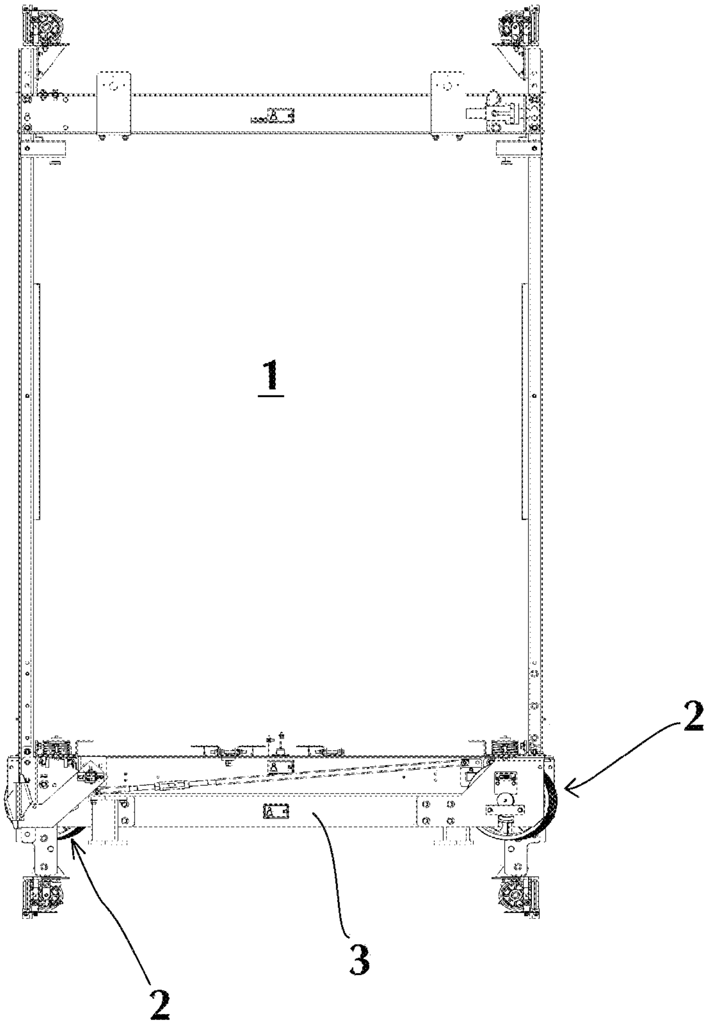

| | | | | |
|---|---|---|---|---|
| 8,863,908 | B2 * | 10/2014 | Villa | B66B 1/302 187/295 |
| 2015/0083528 | A1 * | 3/2015 | Kattainen | B66B 5/0006 187/393 |
| 2015/0336768 | A1 * | 11/2015 | Otsuka | B66B 1/3492 187/394 |
| 2016/0311649 | A1 * | 10/2016 | Puranen | B66B 5/0018 |
| 2017/0253461 | A1 * | 9/2017 | Villa | B66B 1/44 |

FOREIGN PATENT DOCUMENTS

| | | | |
|---|---|---|---|
| EP | 2468671 | A1 | 6/2012 |
| EP | 3366627 | A1 | 8/2018 |
| JP | 2004-168531 | A | 6/2004 |
| JP | 2014-510959 | A | 5/2014 |
| WO | 2005/009882 | A1 | 2/2005 |

OTHER PUBLICATIONS

European Search Report for European Application No. 20176736 dated Nov. 27, 2020.

* cited by examiner

MOVEMENT EVALUATION METHOD FOR AN ELEVATOR CAR

RELATED APPLICATIONS

This application claims priority to European Patent Application No. 20176736.5 filed on May 27, 2020, the entire contents of which are incorporated herein by reference.

FIELD OF THE INVENTION

The present invention relates to the technical field of positioning systems detecting a movement of an elevator car, wherein a respective data evaluation shall aim to determine the car position in relation to its hoistway.

BACKGROUND OF THE INVENTION

An elevator system comprises at least one elevator car traveling along a hoistway between a plurality of landings. In order to allow for a safe operation of the elevator system, it is necessary to reliably determine the current position of the elevator car within the hoistway. For example, determining the current position of the elevator car within the hoistway with good accuracy is necessary for positioning the elevator car at the landings without a noticeable step between the respective landing and the floor of the elevator car. Such a step would constitute a trap hazard for passengers entering and leaving the elevator car.

For this reason, one has to know details about the movement of the car in the shaft that leads to that elevators are traditionally provided with a positioning system.

Such a system encompasses for example reed switches that are mounted to the elevator car while permanent magnets are provided along the travel path in the hoistway. These magnets are disposed such that a reed switch can react to an adjacent magnet when the car passes the switch by. Specific locations for such interaction are, for example, elevator landing positions, when the car floor is flush with the landing floor. Additionally, safety switches or mechanical ramps are disposed in selected locations, such as near end terminals of the elevator shaft, to determine extreme limits for an allowable elevator car movement in the shaft.

In prior art, it is also known from document EP3366627A1 to monitor the elevator car position in the elevator shaft with electronic monitoring means comprising a position sensor that can be an acceleration sensor.

Motor control is another example scenario to determine the car position. The position information regarding motor components is useful for either controlling the motor itself, but it is also useful for determining positions of other components that move responsive to an operation of the motor. Such a solution is for example disclosed in JP2014510959. To this end, an encoder can be implemented that counts the resolution of a rotating component. Typically, the encoder resolution conversion is derived by the aid of parameters saved in the system to convert the counted pulses into position data. This kind of parameter includes e.g. a calibration parameter for said conversion. Limitation of this solution is however, that any resolution value is just a calculated nominal value and not based on actual physical characteristics of the system. Further, an encoder resolution is provided by using safety parameters that are set within the production phase or that are updated on-site, wherein any safety parameter is only allowed to be changed by special authorized personnel staff. However, due to production variances of the encoders and related parts, it is difficult to know the exact encoder resolution already in the control system production.

A problem with these solutions is also, among others, that they may be unreliable since missing a kind of control or verification. A redundant measurement system on the other hand is cost-intensive. At least when the elevator is in use, the encoder resolution changes also due to wear of encoder rollers or other parts. This phenomenon falsifies the movement data outputted by the encoder-calculation.

AIM OF THE INVENTION

It is an object of the present invention to provide a movement evaluation that is convenient to be used for elevator systems, i.e. for an elevator car that travels in a hoistway whose actual dimensions cannot be predicted as accurately beforehand at the conception phase. However, as said above, it is necessary for the elevator system to accurately detect the car's movement and position any time. Further, the shaft is subjected later on also to physical changes due to permanent high loads, to which the position detection system must be able to react dynamically.

At least, there is a desire to use a movement determination system as a safety device for monitoring an overspeed situation and/or for detecting extreme movement limits of an elevator car.

In the end, a method of and a system for evaluating the movement of an elevator car shall be provided which allows a reliable determination with good accuracy, while being cost-effective and simple in realization or installation.

SUMMARY OF THE INVENTION

The concept of the present invention is based on that movement data as gained by an encoder or acceleration sensor that is involved for measuring the movement of an elevator car is calibrated automatically by the aid of a fixed travelled distance that is defined in the hoistway and that is physically unchangeable. Thus, the defined travelled distance is constant and cannot be changed even under stress conditions in the surroundings for the or of the elevator system. For this purpose, an identification marker as a signal strip is installed in the hoistway as constituting the unchangeable defined travelled distance, i.e. the predefined length defines the needed parameter for calibrating the signals that reflect the movement data as gathered online by the encoder or acceleration sensor. In other words, said identification marker is a unitary, single device. This is advantageous, since a signal strip length is stable, it does not change for example due to a settling of the building, or if the mounting position of a signal strip changes erroneously in the shaft.

Basically, the inventive automatic calibration procedure works as follows: When a moving car passes by said identification marker, e.g. an indicator strip, or arrives at it, the referred passing is detected by an indicator strip reader device as installed at the car. Simultaneously, the travelling distance over the indicator strip is also calculated from the incremental encoder that is linked to measure the movement of the car throughout the complete hoistway. Then, when the latter outputs its signals as movement results, the same are compared with the length-parameter-definition of the vertical measurement range of the indicator strip (abbreviated in the following also as "length of the indicator strip"). The conversion factor is then calibrated online based on said comparison. This gives very accurate calibration results for the signals of the encoder, as the length of the indicator strip is accurately known, stable and constant, which does not change due to e.g. setting of the building or wearing of elevator components.

So, the present invention presents a reliable calibration means, that increases the accuracy and safety of the measurement apparatus. Additionally, because changing safety parameters should not be a routine procedure on-site, the invention is beneficial to have the possibility to calibrate the encoder resolution automatically per computer. The invention thus also helps to automate a commissioning of the elevator and to avoid faults causing call-out-charges. In case there is a service need detected because of worn out encoders, a new automatic calibration can be done with the existing parts by adapting the output of the encoder before spares are available.

In more detail, there is a conversion factor between the movement data and the corresponding physical distance travelled by the elevator car. This invention concerns calibrating that conversion factor, such that the movement data would scale to a travelling distance as accurate as possible.

In more detail, the present invention introduces a new method. The latter is modified with respect to convenient embodiments. Further, there is a movement determination system.

As regards the system, the same comprises an incremental encoder that may be mounted to the elevator hoisting machine, or to the shaft, or to the car. For example, the incremental encoder can be mounted to a rope pulley which is a free rotating pulley around which a hoisting rope of the elevator system is guided. According to a first possibility, the free pulley can be mounted to a car sling when being installed at the car site and it counts the rotation pulses as soon as the car moves in the shaft. As an alternative, the pulley can be a stationary pulley installed in the shaft, wherein a rope like the overspeed governor rope is guided around such pulley. Then, the pulley also synchronously rotates with the movement of the car, since the car is linked with the overspeed governor rope. At least, the encoder can be alternatively implemented in the motor that drives a traction sheave around which the roping for moving the car is guided. In all cases, the encoder is detecting the movement of the car by counting pulses which coding indirectly references the travelled distance of the car.

The incremental encoder therewith provides a travel movement information of the elevator car that can be processed to then lead to an information that represents the actual relative position of the car in the hoistway. To this end, the rotational movement data of the pulley is transmitted to a controller. Said controller can be installed to a car or elsewhere in the elevator system. The controller can also be part of the safety control system. Anyhow, from the rotational measurement, i.e. the counted pulses, the controller can calculate the distance the rope passed via the pulley when taking into account the diameter of the pulley. By means of a simple correlation the rolling length of the pulley then mirrors the movement distance of the car. Therewith, the position of the car in the shaft can be determined, too. Further, the controller can calculate a speed of the pulley's rotation from travelled distance per time unit. Therefore, an improved accuracy in the travelling distance measurement also means an improved accuracy for the car speed calculation. When now turning to an acceleration sensor, the principle is the same, wherein the acceleration data are to be integrated to gain a speed and relative position of the car.

In the following, number of pulses provided by an incremental encoder and the physical distance travelled by the elevator car is called "encoder resolution".

The present invention is now about to calibrate the movement data that is coming from the encoder or sensor: The encoder resolution is verified when the car passes a reference distance in the shaft that reflects an absolute and unchangeable travel distance and that is absolute constant over time. Such reference distance comes from at least one identification marker that is arranged at a wall of or any other structure of the hoistway. Taking such marker(s) into consideration aids for the determination of the current movement data of the elevator car within the shaft, since the data as transmitted by the encoder or sensor can be correlated each time when the elevator car passes said marker(s) in the shaft.

As a kind of identification markers, there can be an indicator strip with position reference magnets that are between door zones, or as representing a convenient example being a marker on a landing door zone and provided for example with door zone magnets. These provide a vertical measurement range of approximately 20 to 30 centimetres. In this case, the elevator car is equipped with a reader device reading from the magnets an identification mark corresponding to the linear position of the elevator car, which then can be converted into a length dimension. It is to be noted, that the distance between single magnets is fixed and unchangeable within the length of the indicator strip. Then, the elevator car movement data outside of the landing zone can be measured over the entire length of the hoistway with the encoder, wherein the encoder resolution is calibrated automatically with zone magnets of the indicator strip.

According to an example, a marker can be positioned at each landing, respectively, leading to several indicator stripes. This combination of encoder/accelerator and markers realizes that the position of the car can be known during the movement of the car between two markers, while the recalibration gains a correction-if needed-to adjust the encoder resolution when passing an indicator strip.

It is also possible that there are different kinds of indicator strips, with different lengths. In that case, different lengths of the indicator strips must be taken into consideration in the calibration process for the encoder resolution. It is also possible that only a subsection (or plurality of subsections) of the length of the individual indicator strip is used for calibration. Preferably, this calibration procedure is repeated constantly during elevator operation. It can be so, that calibration is not made solely based on travel over single indicator strip, but based on travel over plurality of indicator strips, such as travel over three sequential indicator strips. Alternatively, travel over single indicator strip can be repeated multiple times.

If a single calibration procedure would indicate a change in the encoder resolution that exceeds an allowed range, a calibration may be rechecked. If the allowed range is still exceeded, there are the possibilities to either take the elevator out of operation or to continue with an elevator operation but order a maintenance visit, such that an operating condition of the movement determination system will be verified, and if necessary, maintenance is provided.

To transmit the data of the encoder and the identification markers, the elevator car is provided with a safety bus system including node(s), which being connected to an electric safety controller via a data bus (safety bus) which is guided along with the trailing cable. The reader of the encoder, as well as the reader of the identification markers is connected to the bus node such that movement data of the encoder and the data from the identification markers is transferred to the safety controller. The movement measurement arrangement as including above elucidated components is thus designed to match the high safety level of the electronic safety controller, such as for example Safety Integrity Level 3 (SIL3) in accordance with the norm EN81-20; IEC 61508. Alternatively, the encoder resolution calibration process may be performed in the bus node before forwarding it to the safety controller.

Based on the receipt of exact movement results about the car's movement due to the automatic calibration step of the encoder resolution according to the invention, there is also provided a more exact positioning of the car resulting therefrom. When for example the elevator car is starting its run at a floor level the current car's location is outputted to the positioning system. As soon as there is a movement of the car along the shaft, there is a movement of the diverting pulley being incrementally shifted in its rotation and automatically synchronised with the car's movement. Based on that a rope slippage on the diverting pulley is minimal, the car movement can be accurately calculated by utilizing the diverting pulley's diameter. However, as soon as there is some wear of the rope pulley during its lifetime for example, which wearing can affect its diameter value, there is a compensation of this phenomenon possible since by the nature of the invention, there can be a correction of the encoder resolution.

Further, a constant deviation or error in the data as output from the rope pulley will be corrected by the encoder resolution adapting therewith inter alia the diameter value of the rope pulley accordingly in the memory of the safety controller. By monitoring these data, one can monitor the diverting pulley's wear and in response thereto trigger service needs for it.

In the following, the invention is elucidated by means of an embodiment as shown in the drawings. In these, FIG. 1 is a view of parts of an elevator car with a rope pulley mounted according to the invention FIG. 2 shows details of the rope pulley according to the invention; one detail is a plan view whereas the other one is a sectional view.

Figure 3B:
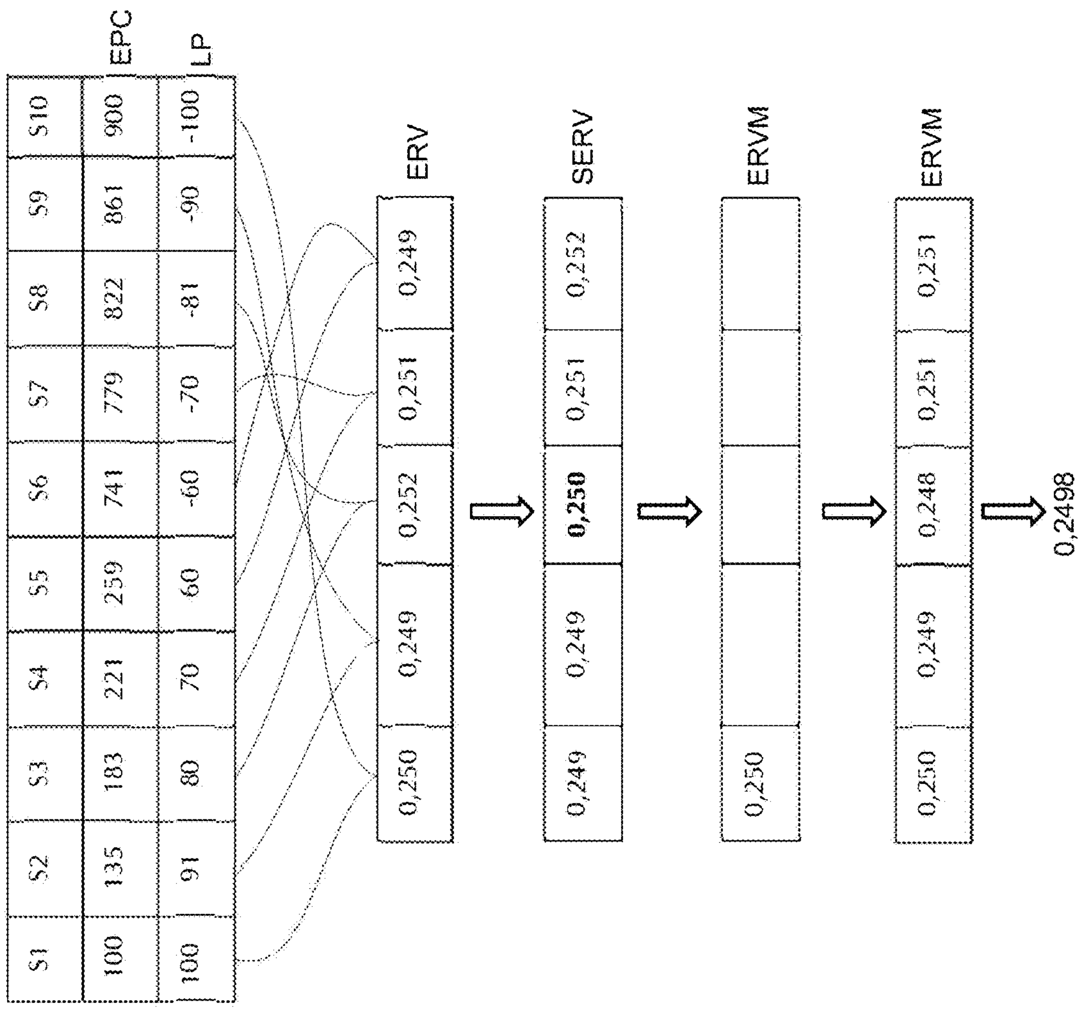
Figure 3A:
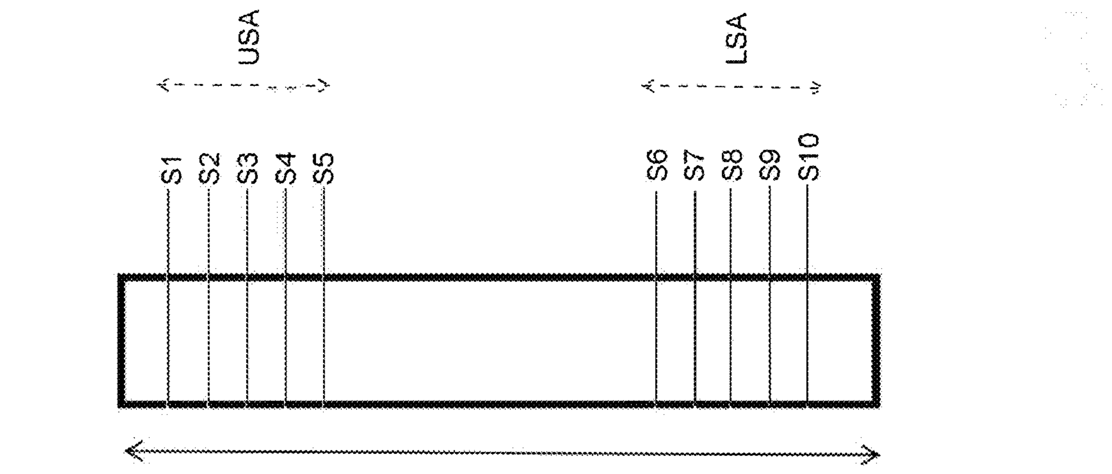

FIGS. 3A-3B visualized a possible calibration algorithm.

FIG. 1 shows a sling of an elevator car 1. At its bottom there is a pulley beam 3 at which there are mounted two rope pulleys 2 via which a hoisting rope (not shown) for the suspension of the car is guided. Both of these rope pulleys 2 are provided with an encoder. As there are two rope pulleys with encoders, respectively, a reciprocal comparison of the encoder information is performed to increase the reliability of safety level of the arrangement for determining the position of the car within the shaft.

Figure 2:
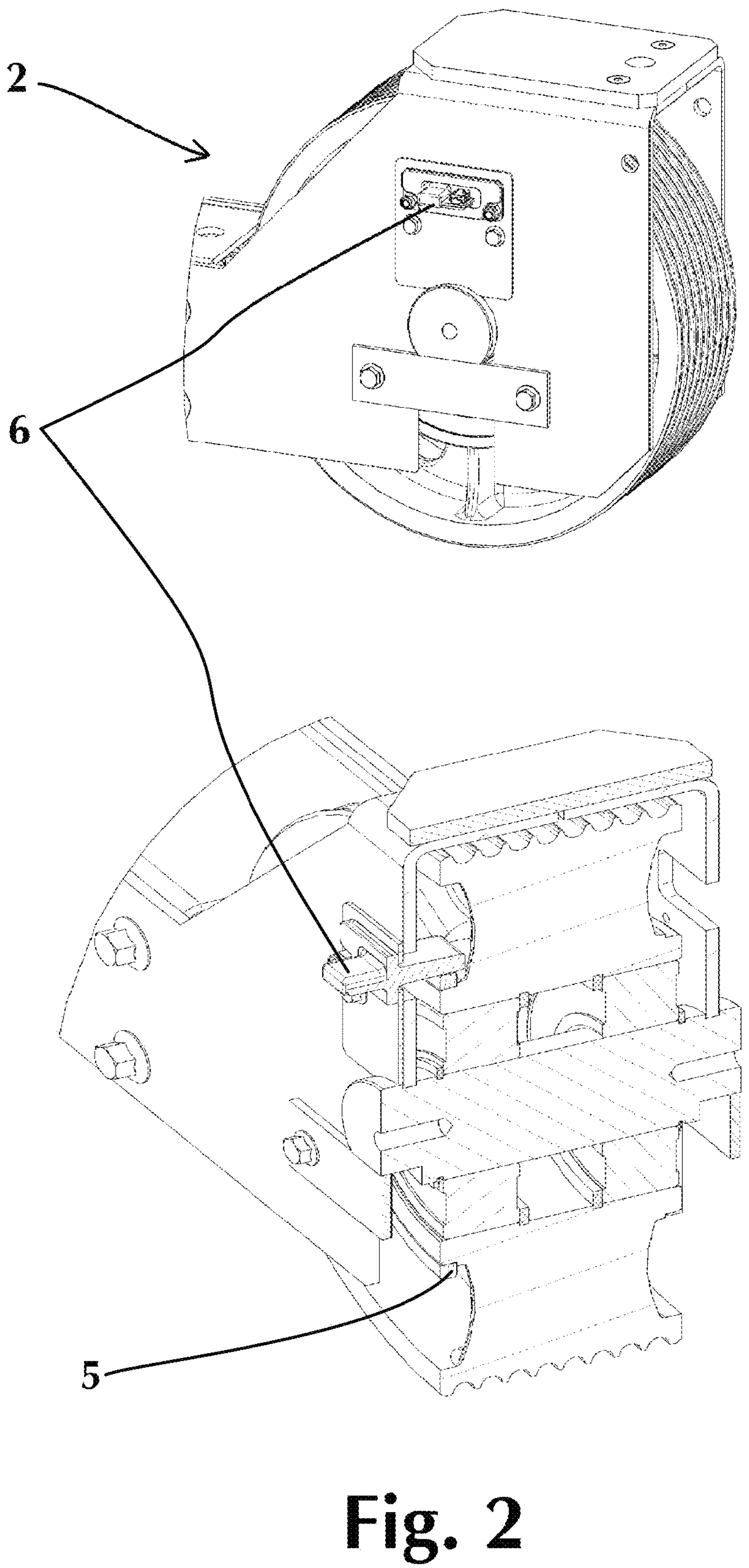

The encoder is preferably a magnetic encoder, as shown in FIG. 2. It comprises a magnetic band 5 mounted on a shelf of the rope pulley 2. A reader 6 is mounted in a hole of the pulley beam 3.

Instead of an encoder, an acceleration sensor mounted to the car could be used for speed and position calculation of elevator car.

While the elevator car is further equipped with an identification marker reader device, there are identification markers installed in the elevator shaft that functionally act together.

The elevator car is also provided with a safety bus node, which is connected to an electric safety controller via a data bus, i.e. safety bus, which is included in the trailing cable. The reader 6, as well as the identification marker reader device, is connected to the bus node such that movement data of the encoder is transferred to the safety controller.

According to FIGS. 3A-3B (may be collectively referred to herein as FIG. 3) there is visualized a possible algorithm for the calibration. As to be seen on left side, there is shown an elevator hoistway in symbolic view, in which a car can move up and down (shown by the left arrow). A floor magnet stripe is installed in the hoistway at the height of a floor, which stripe is divided into ten almost equidistant sample areas S1 to S10. There is an upper scaling area "USA" and a lower scaling area "LSA", each encompassing five of them, namely the upper scaling area having numbers from S1 to S5 and the lower scaling area having numbers from S6 to S10. These two groups of "USA" and "LSA" can be separated over a specific distance but belong to one and the same identification strip constituting the identification marker. While the upper scaling area "USA" is from 55 mm to 105 mm, the lower scaling area "LSA" is from −55 mm to −105 mm in this example. Each area from S1 to S10 is provided with an identification mark, i.e. a value resolved from the varying magnetic field of the magnets of the identification strip, which value identifies the respective area position as a linear position "LP".

So to say, area "sample 1" is allocated the linear position value "100" retrieved from the identification marker by means of the identification marker reader device;

area "sample 2" is allocated the linear position identifier "91";

area "sample 3" is allocated the linear position identifier "80";

area "sample 4" is allocated the linear position identifier "70";

area "sample 5" is allocated the linear position identifier "60";

area "sample 6" is allocated the linear position identifier "−60";

area "sample 7" is allocated the linear position identifier "−70";

area "sample 8" is allocated the linear position identifier "−81";

area "sample 9" is allocated the linear position identifier "−90";

area "sample 10" is allocated the linear position identifier "−100";

When the car has passed by the entire identification strip, a linear position change can be calculated for each sample 1 to 10 over the entire range of said sample areas by:

Linear position change[1]= "LP of S1" minus "LP of S10";

Linear position change[2]= "LP of S2" minus "LP of S9" value; etc.

A similar listing is accomplished with the movement data coming from the encoder. To each sample S1 to S10 a corresponding encoder pulse count "EPC" is allocated, wherein an encoder pulse count change is reversely calculated by Encoder pulse count change[1]= "EPC of S10" minus "EPC of S1";

Encoder pulse count change[2]= "EPC of S9" minus "EPC of S2"; etc.

In the next step, an encoder resolution value is calculated for all the samples by:

$$\text{Encoder resolution value “}ERV\text{”[mm per pulse]} = \frac{\text{Linear position change}}{\text{Encoder pulse count change}}$$

This leads to five results as listed in the table below and titled "ERV".

Then, the encoder resolution values are sorted in an ascending order which listing is titled "SERV" for Sorted Encoder Resolution Values.

In the next step, a median value is stored to an array that includes the Encoder resolution values for all passed area positions, i.e. the magnets allocated therewith. This array-listing is titled "ERVM" for Encoder Resolution Values Median. When having repeated the calculation for the median value four times, an array with five placeholders is filled into which a median-resolution-value is set for all passed magnets. This shows the best-mode, while a minimum of three resolution median values should be calculated for passing at least three magnets to gain a reasonable result. This is a matter of statistical phenomenon: While a more reliable measurement result may be achieved when the number of samples increases, it showed in practice that three magnets would be adequate for a minimum reliable result. A repetition of the same calculation is then made for at least three magnets, and their median values are set in the same way. As one can see in the lowest EVRM table of FIG. 3 there are 5 different values stored, meaning the same calculation that has been repeated for five different magnets, and their median values have been stored in said EVRM table.

Now, a median resolution is calculated for each successfully sampled magnet and stored into array. When sufficient number (let's say three) of such median values exist, a mean value is calculated and taken as conversion factor. In the end, from the encoder median resolution values for all magnets an encoder resolution value is calculated—that is in the present example 0,2498. This value is now taken as a conversion factor for converting the encoder pulse counts into the distance travelled, what reflects the calibration of the movement data. The shown algorithm has some benefits: First of all, it is easy of being implemented in a computer program of a processor. For example, selecting a median value instead of a mean value, means that a computer program doesn't have to make calculations, but only a comparison of separate values and a selection therefrom, which doesn't require much processing power. Secondly, different lengths between the samples within the same magnet will be covered, including the maximum length as defined with samples 1 and 10. Of course, there will be shorter lengths also, such as that between samples 5 and 6, but nevertheless there is a median value selection, too, which will exclude possible individual errors.

The invention claimed is:

1. A method for evaluating movement of an elevator car within a hoistway, the method comprising:

gathering first movement data of the elevator car using a rotation encoder or an acceleration sensor;

reading a first plurality of values of at least one identification marker, the at least one identification marker being in the hoistway such that the elevator car passes or arrives at the at least one identification marker based on movement of the elevator car in the hoistway, the first plurality of values including a first pair of values of a first identification marker, the first pair of values indicating a first defined length of the first identification marker, the first identification marker including a first pair of sample areas respectively corresponding to the first pair of values, and the first identification marker being among the at least one identification marker;

calculating a conversion factor based on the first pair of values and a first pair of movement data readings among the first movement data, the first pair of movement data readings respectively corresponding to the first pair of values; and calibrating second movement data based on the conversion factor to obtain calibrated second movement data.

2. The method according to claim 1, wherein the method is performed automatically based on the elevator car passing by the first identification marker.

3. The method according to claim 1, wherein the calibrating includes calibrating the second movement data into position data of the elevator car based on the conversion factor, the position data corresponding to a position of the elevator car in the hoistway.

4. The method according to claim 1, wherein the first plurality of values include a second pair of values of a second identification marker that indicate a defined length of the second identification marker, the second identification marker being among the at least one identification marker; and the calculating the conversion factor includes calculating the conversion factor based on, the first pair of values, the first pair of movement data readings, the second pair of values, and a second pair of movement data readings among the first movement data, the second pair of movement data readings respectively corresponding to the second pair of values.

5. The method according to claim 1, wherein the calibrating is performed by a controller.

6. The method according to claim 1, wherein the first identification marker includes a plurality of pairs of sample areas, the first pair of sample areas being among the plurality of pairs of sample areas, the first pair of sample areas representing an uppermost sample area and a lowermost sample area among sample areas of the first identification marker with respect to a first direction, and the first direction representing a direction in which the elevator car is configured to move in the hoistway;

the plurality of pairs of sample areas include a second pair of sample areas, the second pair of sample areas representing a second uppermost sample area and a second lowermost sample area among the sample areas of the first identification marker with respect to the first direction, the first plurality of values including a second pair of values corresponding to the second pair of sample areas, and the second pair of values indicating a second defined length of the first identification marker; and the plurality of pairs of sample areas include a third pair of sample areas, the third pair of sample areas representing a third uppermost sample area and a third lowermost sample area among the sample areas of the first identification marker with respect to the first direction, and the third pair of sample areas, the first plurality of values including a third pair of values corresponding to the third pair of sample areas, and the third pair of values indicating a third defined length of the first identification marker.

7. The method according to claim 6, wherein the calculating the conversion factor comprises:

calculating a first measured length based on a difference between the first pair of movement data readings;

calculating a second measured length based on a difference between a second pair of movement data readings among the first movement data, the second pair of movement data readings respectively corresponding to the second pair of values;

calculating a third measured length based on a difference between a third pair of movement data readings among the first movement data, the third pair of movement data readings respectively corresponding to the third pair of values;

calculating a first encoder resolution value based on a ratio of the first defined length to the first measured length;

calculating a second encoder resolution value based on a ratio of the second defined length to the second measured length;

calculating a third encoder resolution value based on a ratio of the third defined length to the third measured length; and calculating a first median value among the first encoder resolution value, the second encoder resolution value and the third encoder resolution value, the conversion factor being based on the first median value.

8. The method according to claim 7, wherein the calculating the conversion factor comprises calculating a mean value based on the first median value and at least one second median value, each of the at least one second median value being based on, third movement data gathered using the rotation encoder or the acceleration sensor, and second values of the at least one identification marker.

9. The method according to claim 6, wherein the sample areas of the first identification marker are linearly aligned in the first direction.

10. The method according to claim 6, wherein the sample areas correspond to magnets included in the first identification marker.

11. The method according to claim 1, further comprising: positioning the elevator car within the hoistway based on the calibrated second movement data.

12. The method according to claim 1, wherein the gathering the first movement data is performed using the rotation encoder.

13. A movement determination system for an elevator car configured to move in a hoistway, the movement determination system comprising:

a measuring device configured to gather first movement data of the elevator car, the measuring device including a rotation encoder or an acceleration sensor;

at least one identification marker configured to indicate at least one defined length, the at least one identification marker being in the hoistway such that the elevator car passes or arrives at the at least one identification marker based on movement of the elevator car in the hoistway;

a reader device configured to read a first plurality of values of the at least one identification marker, the first plurality of values including a first pair of values of a first identification marker, the first pair of values indicating a first defined length of the first identification marker, the first identification marker including a first pair of sample areas respectively corresponding to the first pair of values, and the first identification marker being among the at least one identification marker; and a controller configured to, calculate a conversion factor based on the first pair of values and a first pair of movement data readings, the first pair of movement data readings being among the first movement data, and the first pair of movement data readings respectively corresponding to the first pair of values, and calibrate second movement data gathered by the measuring device based on the conversion factor to obtain calibrated second movement data.

14. The movement determination system according to claim 13, wherein the first identification marker includes a plurality of pairs of sample areas, the first pair of sample areas being among the plurality of pairs of sample areas, the first pair of sample areas representing an uppermost sample area and a lowermost sample area among sample areas of the first identification marker with respect to a first direction, and the first direction representing a direction in which the elevator car is configured to move in the hoistway;

the plurality of pairs of sample areas include a second pair of sample areas, the second pair of sample areas representing a second uppermost sample area and a second lowermost sample area among the sample areas of the first identification marker with respect to the first direction, the first plurality of values including a second pair of values corresponding to the second pair of sample areas, and the second pair of values indicating a second defined length of the first identification marker; and the plurality of pairs of sample areas include a third pair of sample areas, the third pair of sample areas representing a third uppermost sample area and a third lowermost sample area among the sample areas of the first identification marker with respect to the first direction, and the third pair of sample areas, the first plurality of values including a third pair of values corresponding to the third pair of sample areas, and the third pair of values indicating a third defined length of the first identification marker.

15. The movement determination system according to claim 14, wherein the controller is configured to calculate the conversion factor including:

calculating a first measured length based on a difference between the first pair of movement data readings;

calculating a second measured length based on a difference between a second pair of movement data readings among the first movement data, the second pair of movement data readings respectively corresponding to the second pair of values;

calculating a third measured length based on a difference between a third pair of movement data readings among the first movement data, the third pair of movement data readings respectively corresponding to the third pair of values;

calculating a first encoder resolution value based on a ratio of the first defined length to the first measured length;

calculating a second encoder resolution value based on a ratio of the second defined length to the second measured length;

calculating a third encoder resolution value based on a ratio of the third defined length to the third measured length; and calculating a first median value among the first encoder resolution value, the second encoder resolution value and the third encoder resolution value, the conversion factor being based on the first median value.

16. The movement determination system according to claim 15, wherein the controller is configured to calculate the conversion factor including calculating a mean value based on the first median value and at least one second median value, each of the at least one second median value being based on, third movement data gathered using the rotation encoder or the acceleration sensor, and second values of the at least one identification marker.

17. The movement determination system according to claim 14, wherein the sample areas of the first identification marker are linearly aligned in the first direction.

18. The movement determination system according to claim 14, wherein the sample areas correspond to magnets included in the first identification marker.

19. The movement determination system according to claim 13, wherein the controller is configured to position the elevator car within the hoistway based on the calibrated second movement data.

20. The movement determination system according to claim 13, wherein the measuring device includes the rotation encoder.

* * * * *